US011521367B2

(12) United States Patent
Elliott et al.

(10) Patent No.: US 11,521,367 B2
(45) Date of Patent: Dec. 6, 2022

(54) CHARACTERIZATION OF A BALL GAME RACKET STRING PATTERN

(71) Applicant: Head Technology GmbH, Kennelbach (AT)

(72) Inventors: Nathan Elliott, Wolfurt (AT); Ralf Schwenger, Weiler-Simmerberg (DE)

(73) Assignee: Head Technology GmbH, Kennelbach (AT)

( * ) Notice: Subject to any disclaimer, the term of this patent is extended or adjusted under 35 U.S.C. 154(b) by 0 days.

(21) Appl. No.: 17/377,788

(22) Filed: Jul. 16, 2021

(65) Prior Publication Data

US 2022/0019831 A1 Jan. 20, 2022

(30) Foreign Application Priority Data

Jul. 17, 2020 (DE) ...................... 10 2020 004 305.4

(51) Int. Cl.
*G06V 10/20* (2022.01)
*G06K 9/62* (2022.01)
*A63B 51/02* (2015.01)

(52) U.S. Cl.
CPC .......... *G06V 10/255* (2022.01); *G06K 9/628* (2013.01); *A63B 51/02* (2013.01)

(58) Field of Classification Search
CPC ....... A63B 49/00; A63B 49/022; A63B 51/02; A63B 2049/0202; A63B 2049/0203; A63B 2049/0204; A63B 2049/0207; A63B 2049/0212; A63B 2049/0213; G06F 8/34; G06K 9/628; G06V 10/255; G06V 10/44; G06V 40/1365
See application file for complete search history.

(56) References Cited

U.S. PATENT DOCUMENTS

| 2006/0211526 A1* | 9/2006 | Hauptman | A63B 51/00 473/543 |
| 2007/0105664 A1* | 5/2007 | Scheinert | A63B 49/00 473/461 |
| 2007/0296207 A1* | 12/2007 | Brunner | A63B 51/00 283/115 |
| 2008/0200287 A1* | 8/2008 | Marty | A63B 24/0003 700/91 |
| 2014/0031150 A1* | 1/2014 | Severa | A63B 60/42 473/540 |

(Continued)

FOREIGN PATENT DOCUMENTS

| CN | 1381802 A | * | 11/2002 | |
| CN | 107957866 A | * | 4/2018 | ........... G06F 16/532 |
| DE | 11 2015 003 706 T5 | | 5/2017 | |

(Continued)

OTHER PUBLICATIONS

Crawford et al., "Spin and String Patterns Old, New, and Illegal" (Year: 2013).*

(Continued)

*Primary Examiner* — Dung Hong
(74) *Attorney, Agent, or Firm* — Bookoff McAndrews, PLLC

(57) ABSTRACT

The present invention relates to a method for characterizing a string pattern of a ball game racket frame as well as to the representation of a string pattern image of a strung ball game racket frame.

11 Claims, 12 Drawing Sheets

(56) References Cited

U.S. PATENT DOCUMENTS

| 2017/0232308 | A1 |   | 8/2017 | Germain et al. |          |
|--------------|----|---|--------|----------------|----------|
| 2020/0030667 | A1 | * | 1/2020 | Reichert       | A63B 1/00 |

FOREIGN PATENT DOCUMENTS

| EP |     | 2689814    | A1 | * | 1/2014 | A63B 51/00 |
|----|-----|------------|----|---|--------|------------|
| GB |     | 2056287    | A  | * | 3/1981 | A63B 51/00 |
| GB |     | 2239809    | A  | * | 7/1991 | A63B 51/06 |
| WO | WO- | 2020183018 | A1 | * | 9/2020 | B29B 17/02 |

OTHER PUBLICATIONS

H. Brody, Medicine and Science in Tennis, vol. 8, No. 1, Apr. 2003.

* cited by examiner

CHARACTERIZATION OF A BALL GAME RACKET STRING PATTERN

This patent application claims the benefit under 35 U.S.C. 119 to German Utility Model Application No. DE 10 2020 004 305.4, filed on Jul. 17, 2020, the entirety of which is incorporated herein by reference.

The present invention relates to a method for characterizing a string pattern of a ball game racket frame as well as to the representation of a string pattern image of a strung ball game racket frame.

It has long been known that the string pattern of a ball game racket, i.e. the concrete pattern of the main and cross strings of a string bed, has a decisive influence on the playability of the ball game racket, which is of course due to the fact that the ball is not hit with the racket frame, but that the strings establish the contact between the ball and the frame. In fact, there have always been racket models on the market that differed solely by the string pattern, for example in 1993 the so-called "Wilson Pro Staff Classic 16×18" and the "Wilson Pro Staff Classic 18×20".

For the player, information about the string pattern is therefore of decisive importance when selecting a ball game racket suitable for him/her. However, string patterns are conventionally characterized in a very simple way. For example, the indication of the number of the main and cross strings is typical. In the aforementioned example of the two Wilson rackets, for instance, the indications "16×18" and "18×20" stand for string patterns comprising 16 main strings and 18 cross strings and 18 main strings and 20 cross strings, respectively. However, these relatively rough indications say nothing about how, for example, the distances between adjacent strings are distributed over the string pattern. Experienced players therefore also pay attention, for example, to how many main strings run through the heart or bridge. The points of intersection in the corners can also provide important indications about the string pattern type. For example, a string pattern in which the first cross string begins between the second-outermost and third-outermost main strings tends to be more open than a string pattern in which the first cross string begins between the outermost and second-outermost main strings.

However, all these features give the player only rough indications concerning the actual course of the main and cross strings. Since we are talking here about sometimes very small variations in the distances between adjacent strings in the range of a few percent and a string pattern is defined by almost 40 such distances, it is practically impossible for the average player to seriously assess a string pattern. This is all the more problematic because even small differences in the string pattern can have a major impact on playability. In DE 11 2015 003 706 T5, for example, it is alleged that even the positioning of the smallest mesh(es) is of decisive importance for the service performance.

In fact, however, it is not possible to define an ideal or perfect string pattern that would be equally suitable for all players. On the contrary, the string pattern should ideally be adapted to the player and his/her playing style, since, for example, the point of the string bed at which the maximum "power" can be achieved also depends, i.a., on the ball speed and the racket speed (cf., for example, H. Brody, Medicine and Science in Tennis, vol. 8, no. 1, April 2003).

It is therefore an object of the present invention to provide a method for characterizing a string pattern of a ball game racket frame, which enables the player to distinguish different string patterns more precisely from each other according to objective criteria.

This object is achieved with a method according to claim 1. Preferred embodiments of the method according to the invention are described in the dependent claims.

Accordingly, the present invention is directed to a method for characterizing a string pattern of a ball game racket frame strung in a string bed plane, wherein the intersecting strings of the string pattern form closed cells. Firstly, an image of the string pattern with a viewing axis perpendicular to the string bed plane is created. Subsequently, the closed cells of the string pattern in at least one area of the string pattern are automatically determined from the image. Furthermore, the respective size of the determined closed cells is automatically determined. On the basis of the determined size, the closed cells are then classified according to their size. The string pattern image of the string pattern to be characterized is then represented along with an indication of the class of the closed cells.

In other words, the present invention is based, i.a., on the idea of extracting essentially all relevant information of the string pattern from an image of the string pattern and representing it in a way that enables the player to compare different string pattern images in a simple way, but with objective criteria. For example, if the closed cells are colored differently according to their size, even the inexperienced player can see at a glance which area of the string pattern is covered, for example, by the smallest cells, whether this area is symmetrical or asymmetrical, extends more in length or in width, etc. If two different string patterns have been evaluated on the basis of the same classification, it is also easy to see whether one of the two string patterns is denser or narrower by comparing the color palette.

Of course, the present invention is suitable for string patterns of any ball game racket. However, it is of particularly high value for tennis and squash rackets.

Preferably, the classification is graphically visualized in the representation, for example by assigning one or more of the following graphical parameters to predetermined classes of the classification: color value, tonal value, hatching. However, other representations are also conceivable. For example, the closed cells could be provided with numerical values corresponding to the respective determined size.

The classification can be based on one or more of the following size properties of the cells: area of a cell, length of one or more lateral edges of a cell, length ratio of two lateral edges of a cell. Since, for example, the area of the cell and the length ratio of the lateral edges of the cell indicate different but respectively relevant information to the player, actually two or more representations of the string pattern image, each indicating the class, can be created on the basis of different size properties. Alternatively, different classifications can be combined in one representation. For example, a classification on the basis of the area of each cell could be represented using a color value and, in the same representation, a classification on the basis of the length ratio of the lateral edges could be represented using an additional hatching.

The automatic determination of closed cells can be performed, for example, in that the image of the string pattern is converted into a binary pixel image, wherein the threshold value is selected such that a first value is assigned to each of the pixels of the closed cells, and preferably also to each of the pixels of the frame, and a second value is assigned to each of the pixels of the strings. In this binary image, the contiguous areas which comprise pixels of the first value and are enclosed by pixels of the second value can be identified as closed cells. Standard functions of known image analysis software can be used for this purpose. Of course, it will be clear to the person skilled in the art that for such an evaluation, the image should be taken in such a way that the strings have sufficient contrast with respect to both the frame and the background in order to enable this conversion into a binary image.

For example, once the closed cells have been identified, the number of pixels of each area identified as a closed cell can be determined and each determined number of pixels can be converted to the size of the respective closed cell.

Alternatively, for each area identified as a closed cell, a rectangle that best approximates that area can be determined. Subsequently, one or more of the following size properties of the rectangle can be determined: area of the rectangle, length of one or more lateral edges of the rectangle, length ratio of two lateral edges of the rectangle.

In order to also enable a comparison of absolute numerical values of different string patterns, it is preferred to first take an image of a scale with identical image settings, wherein this scale then allows the conversion from pixels to, e.g., mm.

Instead of a (photographic) image of the string pattern, another data set can also be used as the starting point for the method according to the invention. The closed cells, for example, can also be automatically determined in a scale drawing or in a CAD data set. Accordingly, the present invention is also directed to a method according to claim 1 in which step (a) is omitted and instead the method is carried out using any data set or any graphical representation of the string pattern as a starting point.

It is further preferred to determine the playing properties of the ball game racket frame on the basis of the representation of the string pattern. For example, specific playing properties such as "much power", "little power", "much control", and "little control" can be automatically assigned to specific patterns. This assignment can be performed, for example, by using artificial intelligence, for example a neural network, which has been trained with empirical data from a plurality of players.

Furthermore, it is preferred to determine at least one alternative string pattern that approximates the playing characteristics of the represented string pattern image. If, for example, a player has had very good experience with a particular string pattern which, however, is no longer available in this form, it is possible, for example by pattern matching, to select from a set of available string patterns a string pattern whose playing properties best match the player's preferred string pattern. Artificial intelligence can also be used advantageously for this assignment or selection.

The method according to the invention can also be repeated once or several times for one or more further ball game racket frames in order to compare the determined string pattern images for different ball game racket frames with each other. In this connection, for example, also those closed cells can be automatically identified in which the deviation between, for example, two rackets is particularly large. These cells can then, for example, be highlighted in color. An artificial "difference string pattern" can also be generated, in which each closed cell is classified by a difference value between two string patterns, for example by the respective difference in cell area.

The present invention is further directed to a representation of a string pattern image of a strung ball game racket frame, comprising a representation of the string pattern, optionally including a representation of at least a portion of the ball game racket frame, as well as a classification of the cell sizes of at least one area of interest of the string pattern.

The classification may be graphically visualized in the representation, preferably by assigning one or more of the following graphical parameters to predetermined classes of the classification: color value, tonal value, hatching.

Furthermore, the present invention is directed to a set comprising a ball game racket frame and a representation of the string pattern image determined from the ball game racket frame. If a ball game racket frame is offered to the customer in the form of such a set, the customer can compare the associated string pattern image with the string pattern image of his/her own previously used ball game racket and/or with string pattern images of other ball game rackets offered before making his/her purchase decision and accordingly can also base his/her purchase decision quite specifically on the specific string pattern.

In the following, the present invention is explained in more detail by means of some exemplary string patterns shown in the Figures, in which.

FIGS. 1A to 6A respectively show, by way of example, six different string patterns which differ significantly from one another in terms of their playing properties. However, as revealed by a comparison of FIGS. 1A to 6A, it is extremely difficult to recognize these differences with the naked eye, let alone to quantitatively compare the string patterns.

FIGS. 1B to 6B respectively show the same string patterns as FIGS. 1A to 6A as well as the classifications according to the invention, wherein in these examples the individual meshes of the string pattern (i.e., the closed cells) have been colored with different shades of gray according to their respective area content. The scale ranges from 7.0 $mm^2$ (white) to 18.0 $mm^2$ and larger (black).

As revealed by FIGS. 1B to 6B, the six string patterns can be clearly distinguished from one another by means of the representation of the classification. For example, in the case of FIGS. 1, 2 and 5, the area with the smallest meshes is relatively narrow in width but extends much further in the longitudinal direction than in the case of FIGS. 3, 4 and 6.

Figure 3A:
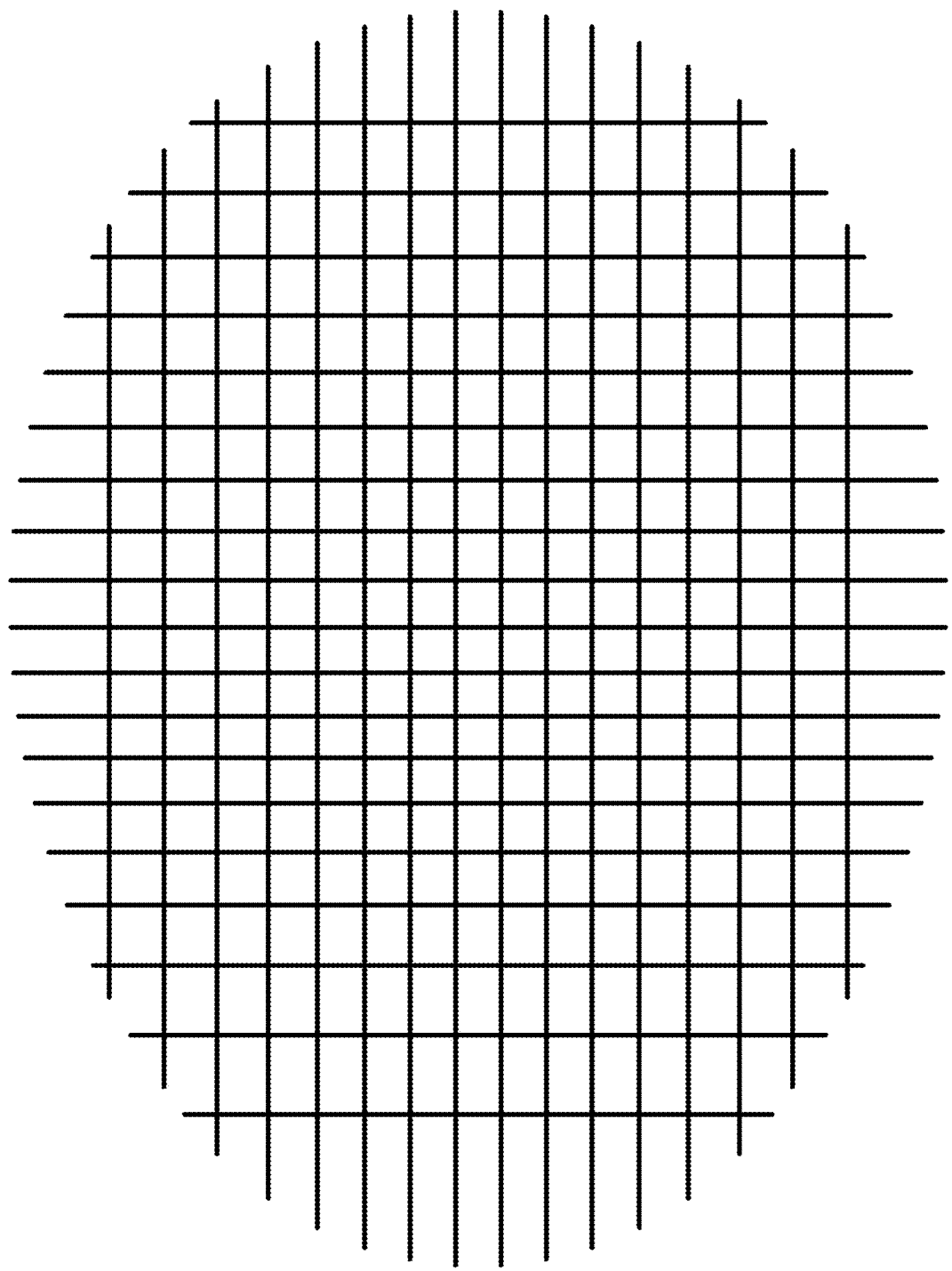
FIG. 3A shows a string pattern image according to a third example.
Figure 3B:
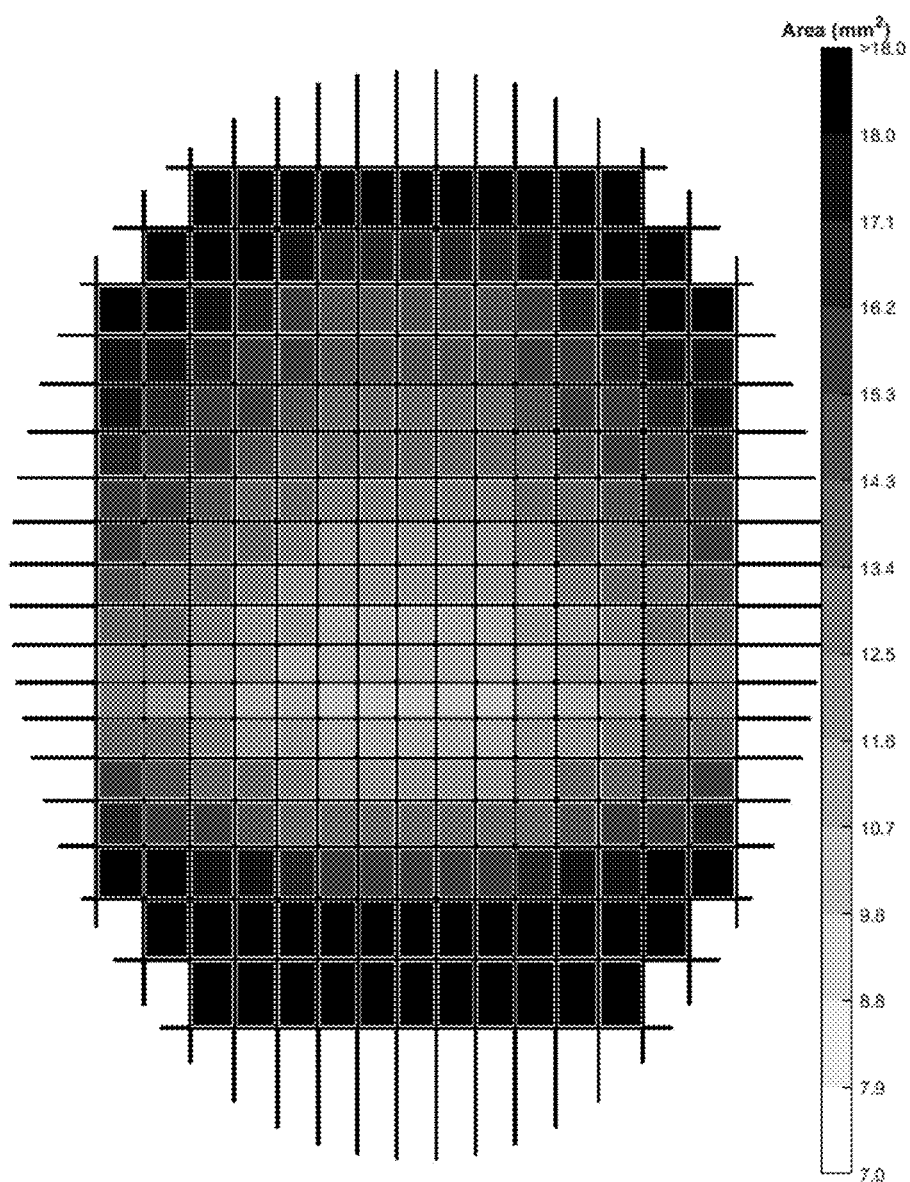
FIG. 3B shows a representation of the string pattern image according to FIG. 3A including a classification according to the invention.
Figure 4A:
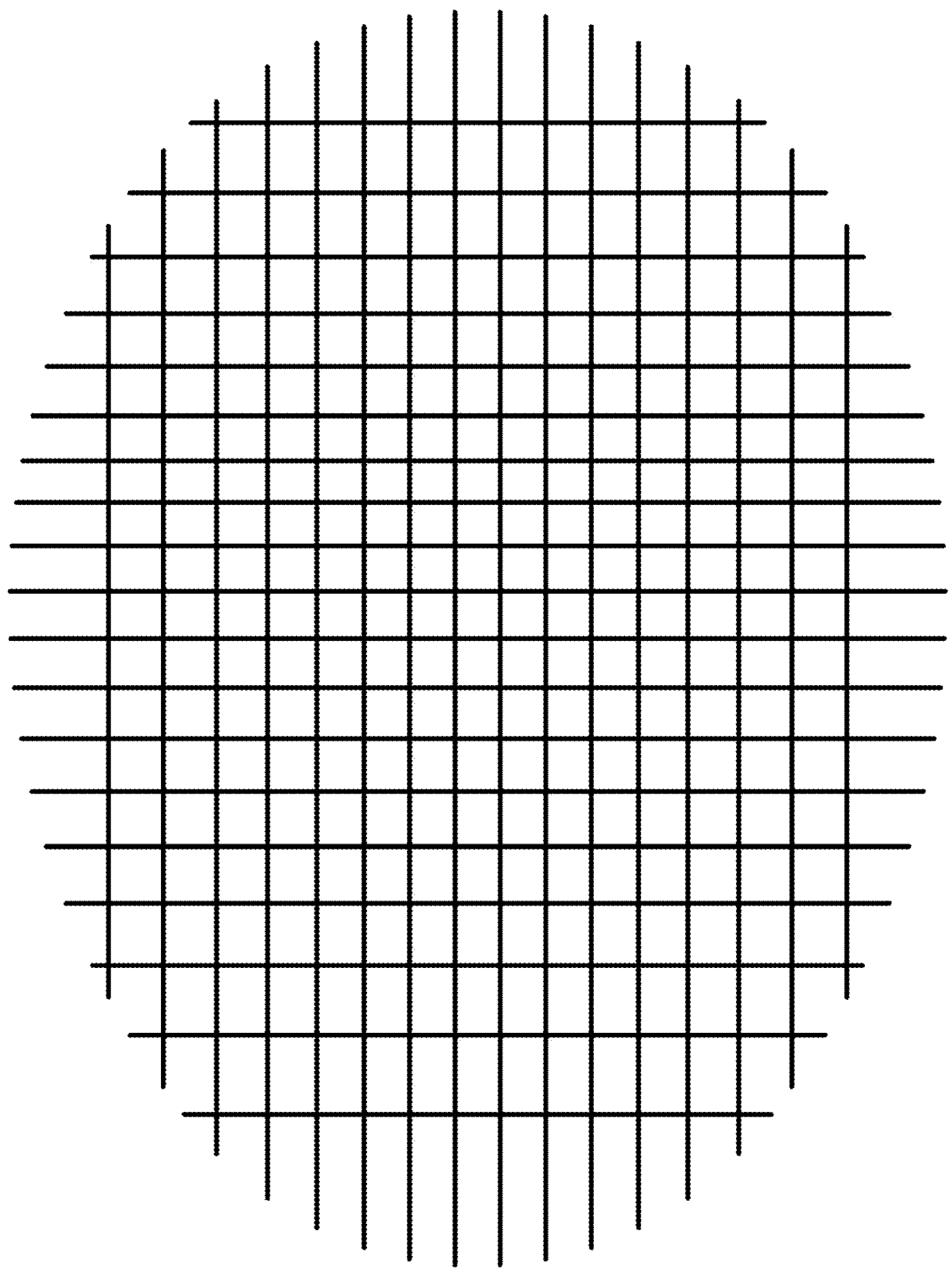
FIG. 4A shows a string pattern image according to a fourth example.
Figure 4B:
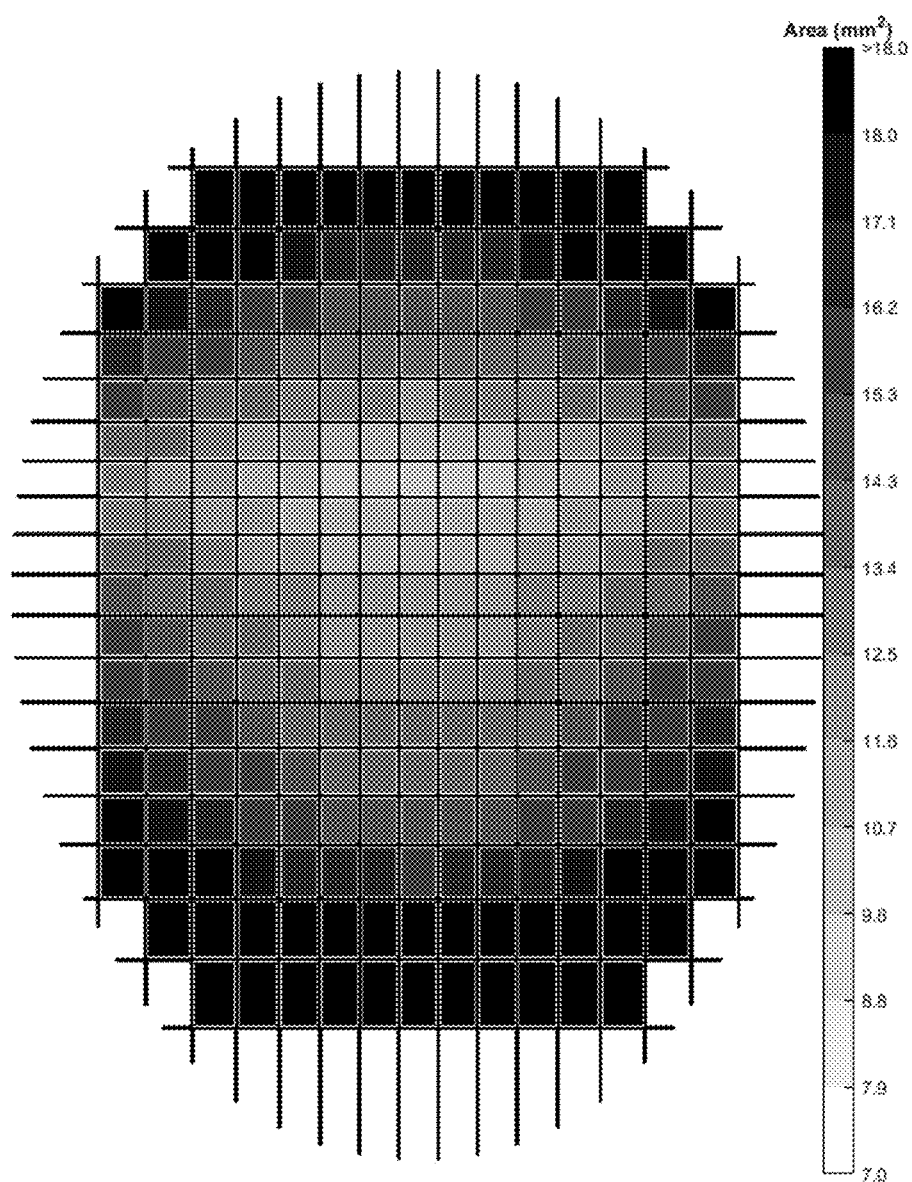
FIG. 4B shows a representation of the string pattern image according to FIG. 4A including a classification according to the invention.
Figure 5A:
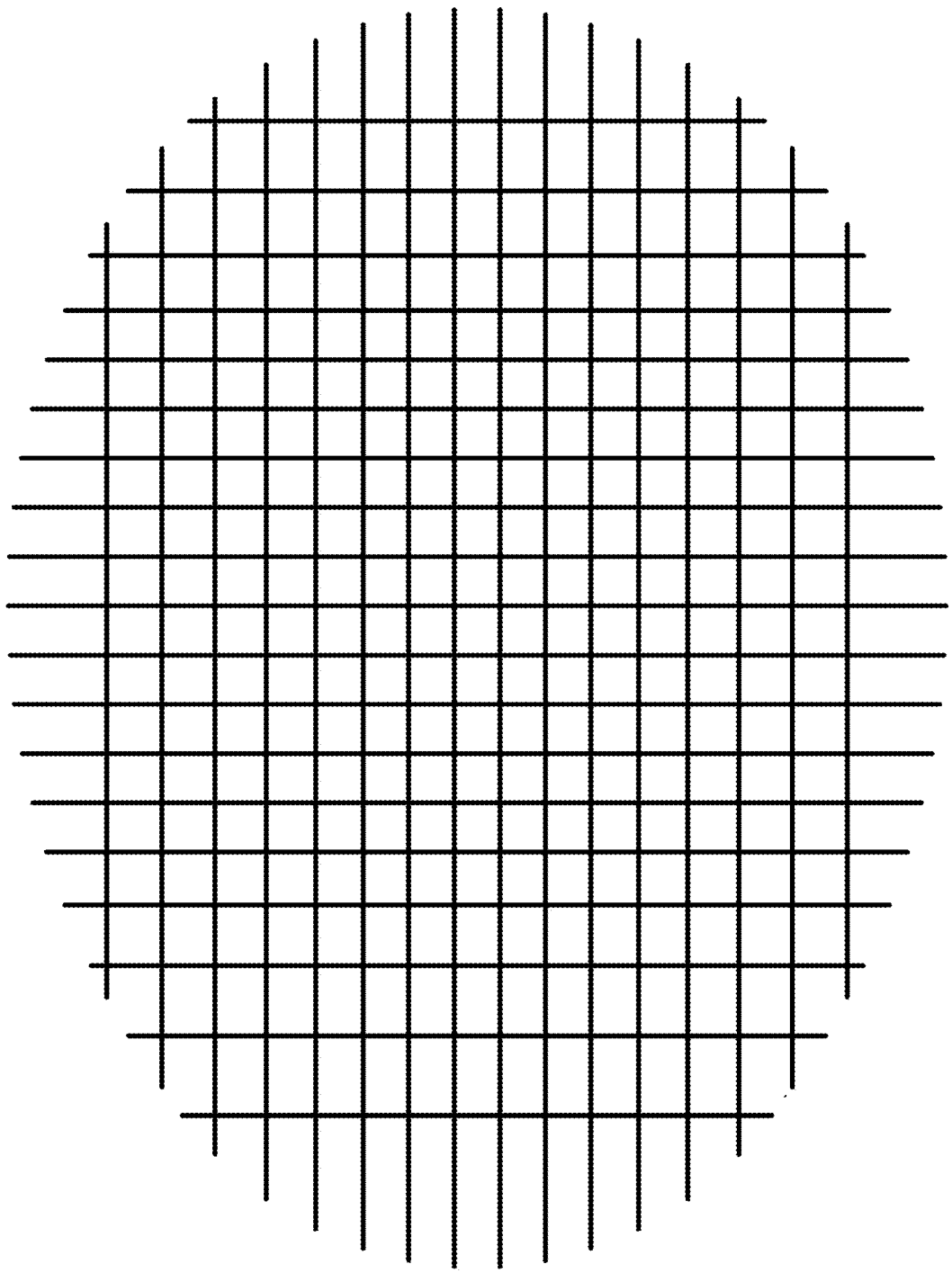
FIG. 5A shows a string pattern image according to a fifth example.
Figure 5B:
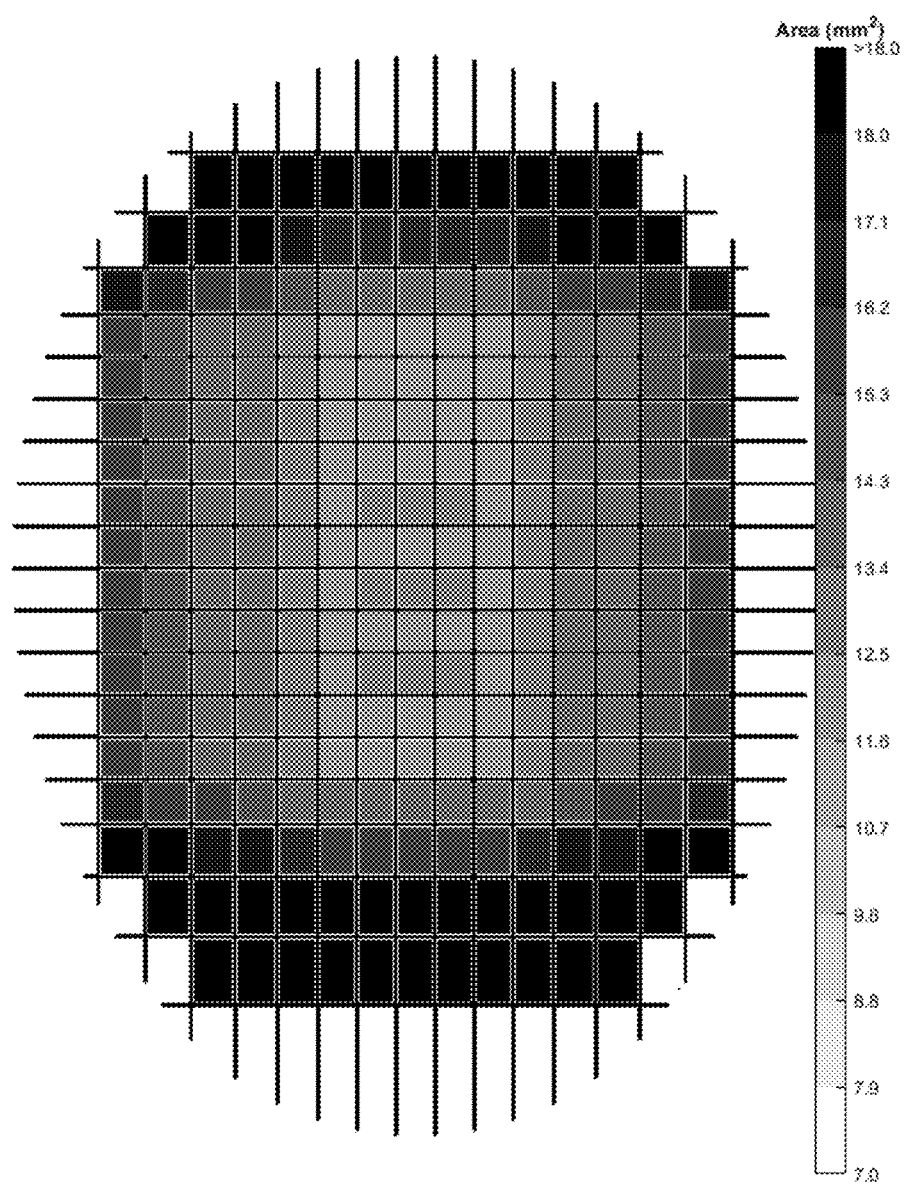
FIG. 5B shows a representation of the string pattern image according to FIG. 5A including a classification according to the invention.
Figure 6A:
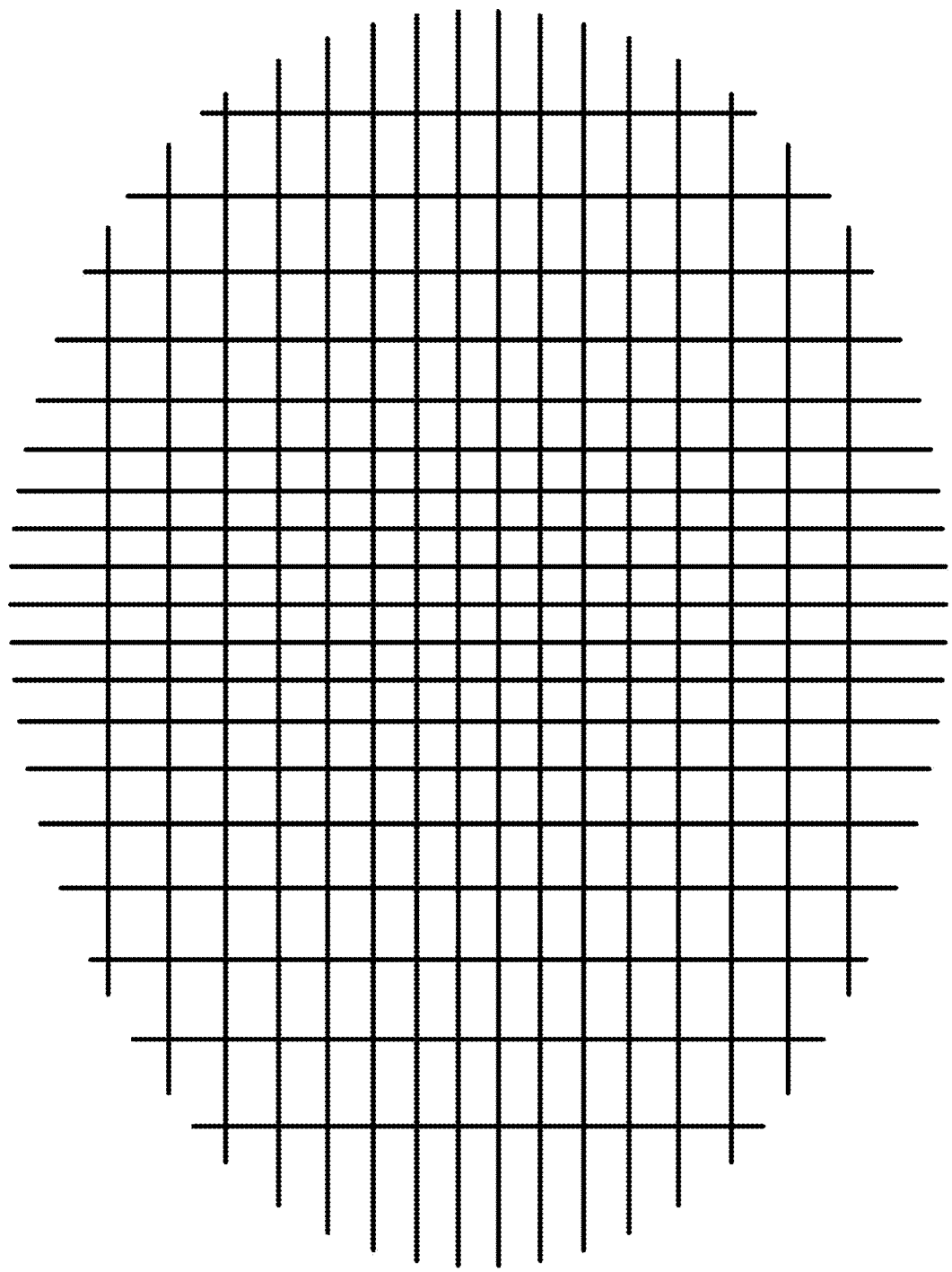
FIG. 6A shows a string pattern image according to a sixth example.
Figure 6B:
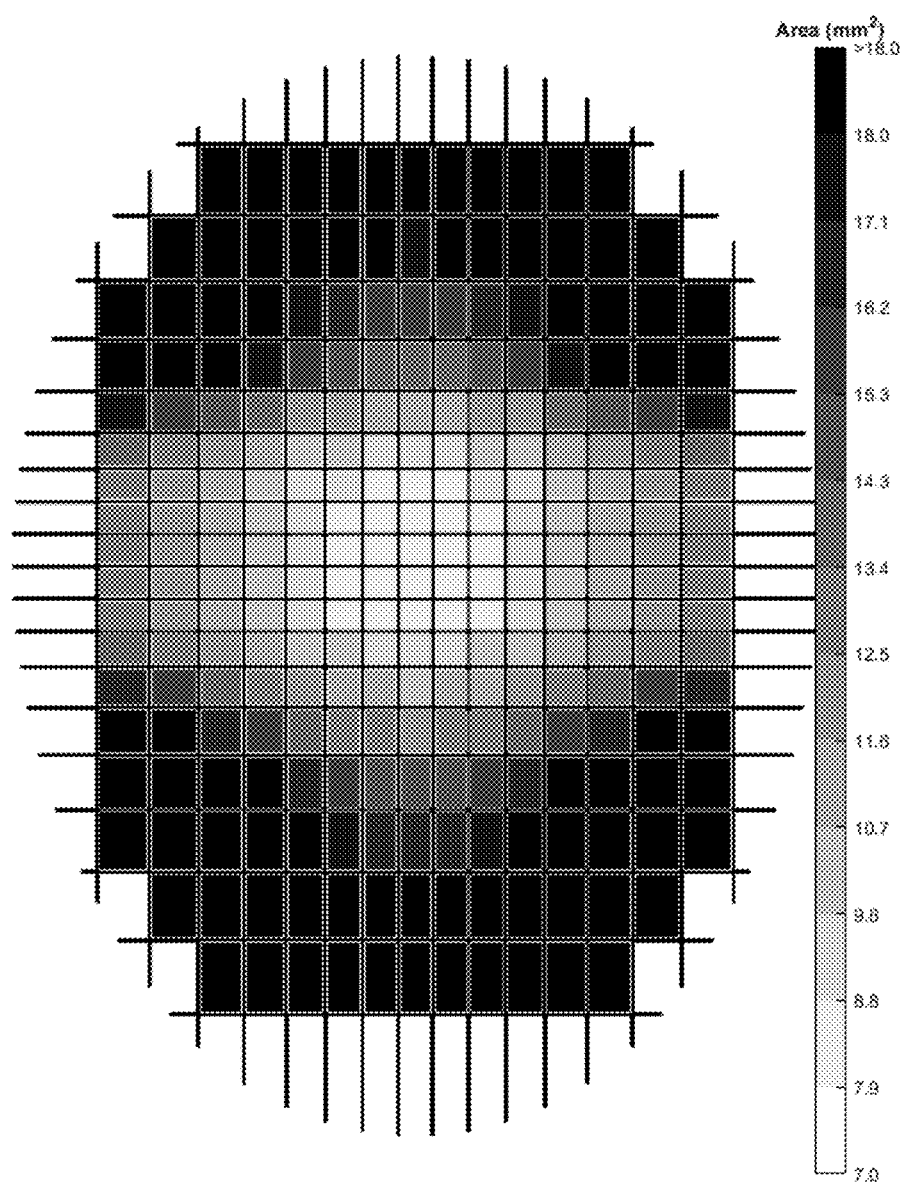
FIG. 6B shows a representation of the string pattern image according to FIG. 6A including a classification according to the invention.

In FIGS. 3 and 4, these areas with the smallest meshes have a similar, relatively wide shape which, however, is mirror-inverted and in FIG. 3 is oriented more in the direction of the racket heart, whereas in FIG. 4 this area is clearly shifted in the direction of the head end.

FIGS. 4 and 6 show qualitatively similar patterns, but the variation from light to dark is much more pronounced in the case of FIG. 6, suggesting that this string pattern varies much more between very small and very large meshes.

In fact, these different representations also allow conclusions to be drawn about the respective playing properties of the ball game racket. The more open a string pattern is, the softer it behaves in contact with the ball and the lower the energy dissipation is due to flattening of the ball during contact with the ball. Therefore, an open string pattern, such as the example according to FIG. 5, has a higher acceleration capacity than a denser one, such as the example according to FIG. 6. As Brody points out (cf. Dr. H. Brody, Unforced Errors and Error Reduction in Tennis, in Professional Tennis Registry), more ball acceleration, however, often means less directional control in play, because as the ball acceleration of the racket increases, the player will reduce or slow down his/her swing, and thus the speed of the struck ball will be determined more by the angle of incidence and angle of exit and less by his/her own swing direction.

However, conclusions about the playing behavior can also be drawn from the dynamics of the string pattern along the longitudinal and/or transverse axis. For example, a string pattern that is relatively uniformly open in width, such as the example according to FIG. 1, has a very high acceleration capacity in the case of hits on the longitudinal axis of the racket, which, however, significantly decreases in the case of hits outside the longitudinal axis of the racket. This is due to the fact that, in the case of hits outside the longitudinal axis of the racket, the racket undergoes rigid-body movements such as rotation about the longitudinal axis and deformations such as torsion, whereby energy is taken away from the struck ball. However, since the string pattern outside this longitudinal axis of the racket is approximately as dense and thus as stiff as on the longitudinal axis of the racket, this leads to a loss of ball acceleration.

Figure 1A:
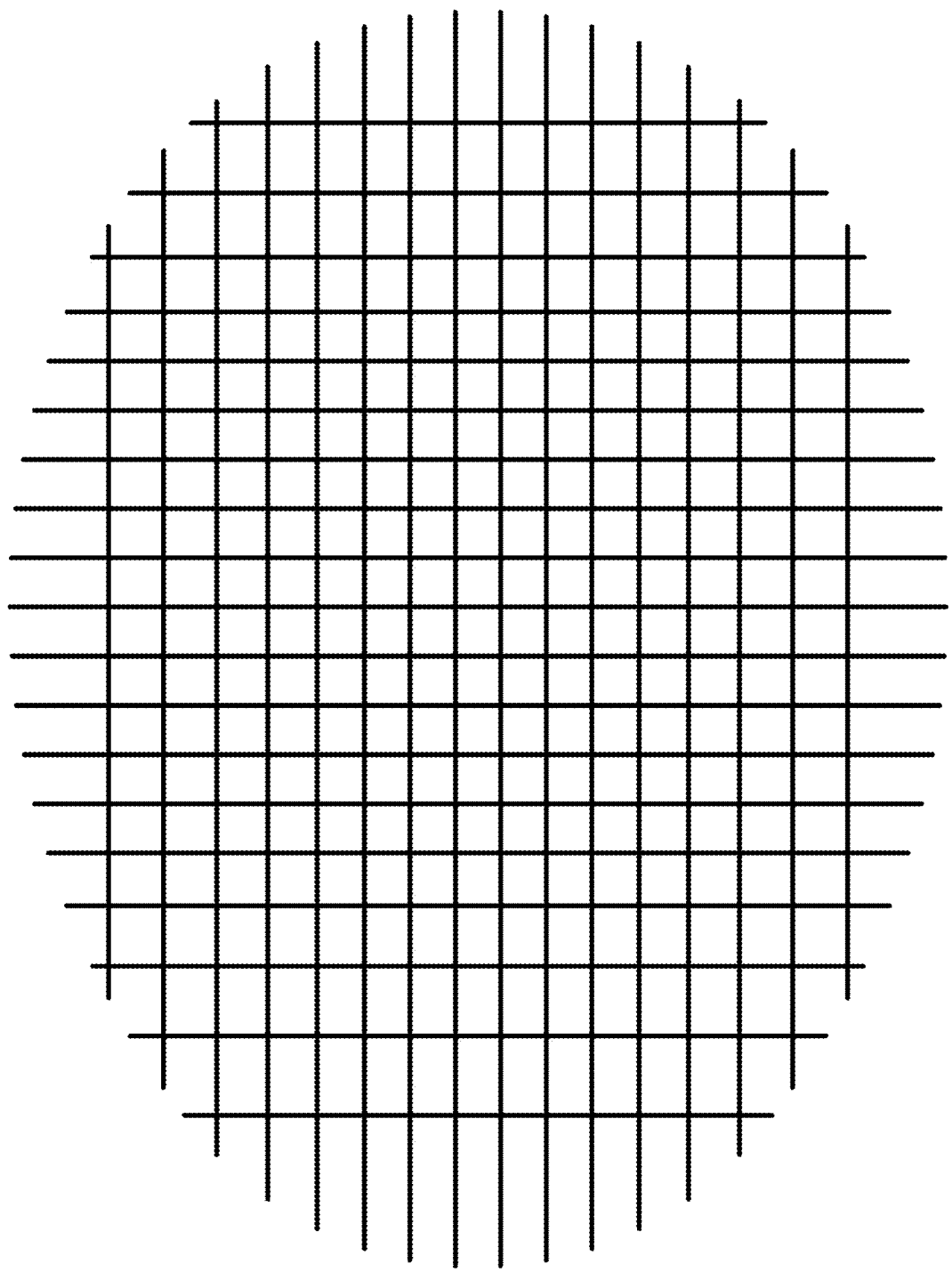
FIG. 1A shows a string pattern image according to a first example.
Figure 1B:
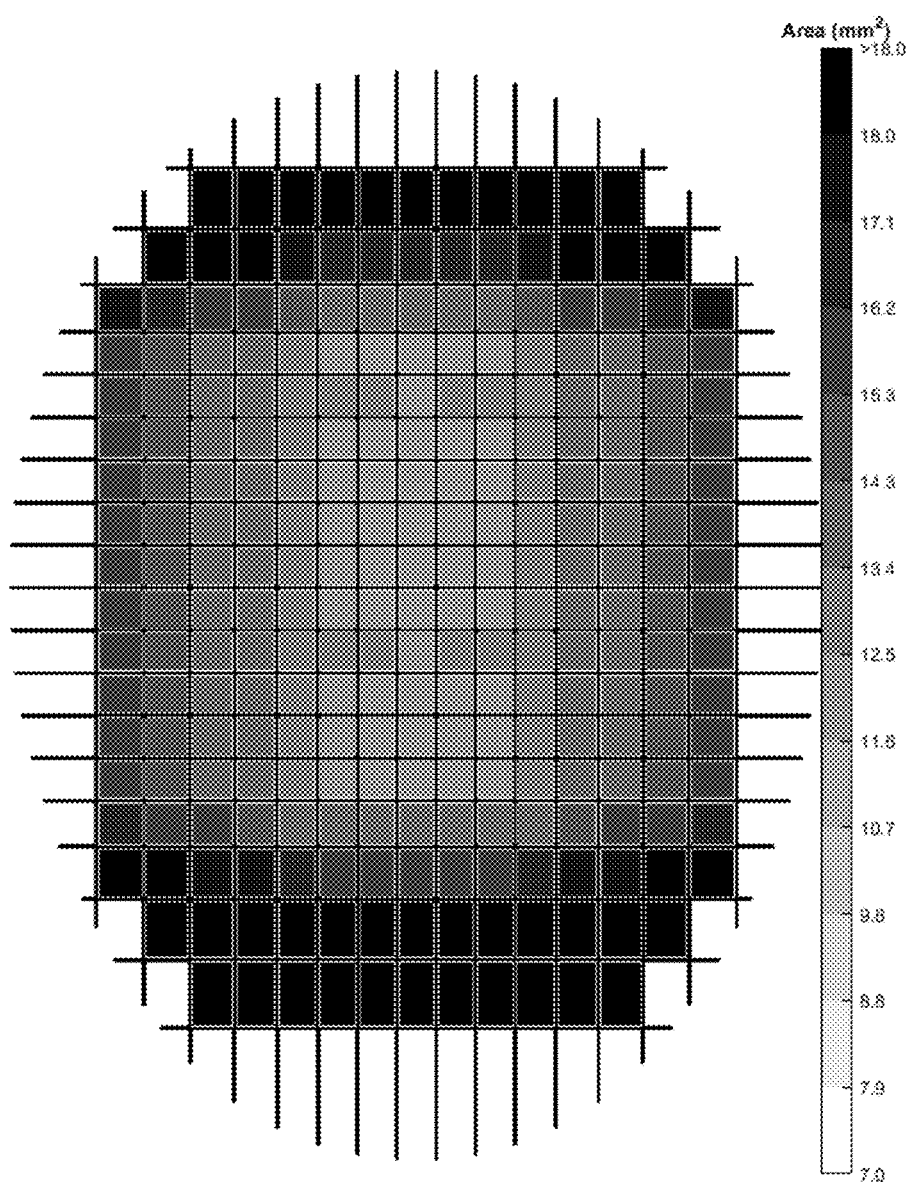
FIG. 1B shows a representation of the string pattern image according to FIG. 1A including the classification according to the invention.
Figure 2A:
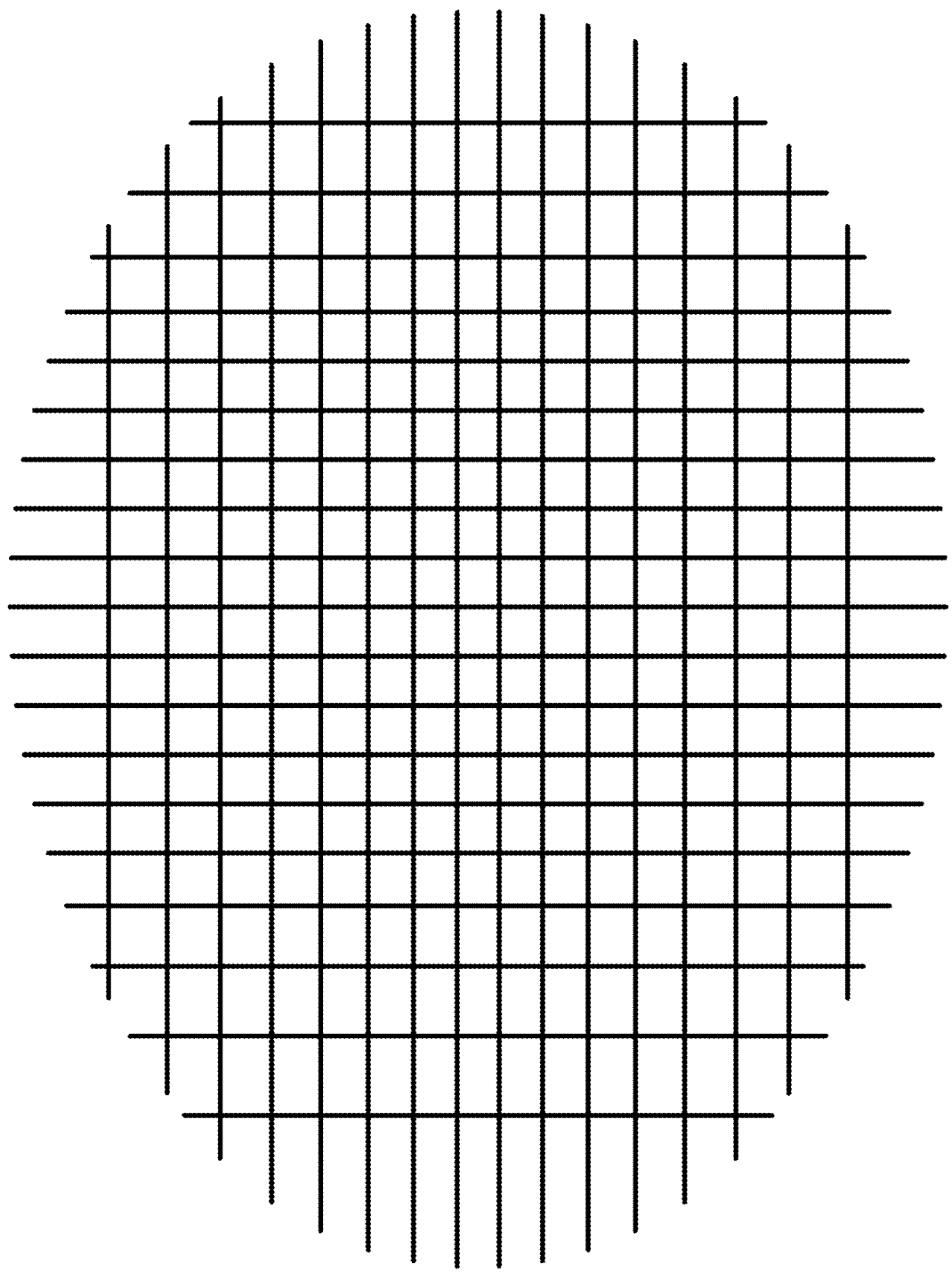
FIG. 2A shows a string pattern image according to a second example.
Figure 2B:
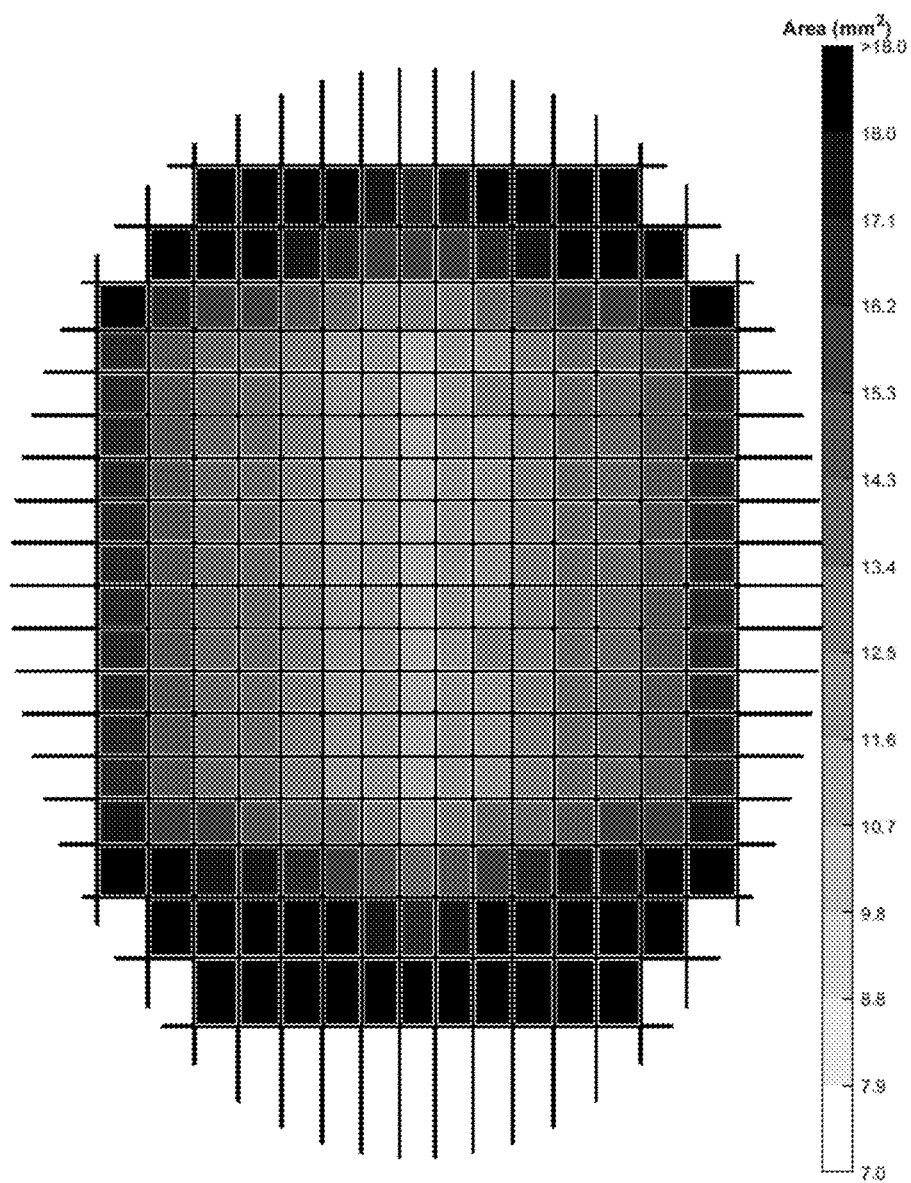
FIG. 2B shows a representation of the string pattern image according to FIG. 2A including a classification according to the invention.

In contrast, in the case of a string pattern that is configured dynamically along the width, as in the example according to FIG. 2, the ball can be better accelerated there via the string pattern due to the more open design of the string net outside the longitudinal axis and thus compensate for the above effects such as rigid body movement and torsion. Hence, such a string pattern has less acceleration capacity than a string pattern according to FIG. 1 in the case of hits on the longitudinal axis of racket, but a higher acceleration capacity in the case of hits outside the longitudinal axis of the racket. It is therefore more forgiving, so to speak, with regard to hitting-point deviations along the width of the racket.

Since there are quite different hitting points for the maximum acceleration capacity depending on the kinematics of the swing (volley: mainly translational movement, groundstroke: strongly rotational component), it also makes sense to vary the string pattern along the longitudinal axis in different ways. For example, in the version according to FIG. 3, the densest point is positioned in the lower half of the racket and therefore the racket actually is well suited for volleys, since they should be hit primarily in this area. In contrast, in the version according to FIG. 4, the densest point is located in the upper half of the racket and the racket is therefore primarily suitable for groundstrokes comprising a strong rotational movement component, which should be hit above the center of the racket (half the length of the racket head).

The invention claimed is:

1. A method for characterizing a string pattern of a ball game racket frame strung in a string bed plane, wherein the intersecting strings of the string pattern form closed cells, said method comprising the steps of
    (a) creating an image of the string pattern with a viewing axis perpendicular to the string bed plane;
    (b) automatically determining closed cells in at least one area of the string pattern from the image;
    (c) automatically determining the respective size of the determined closed cells;
    (d) classifying the closed cells according to their size;
    (e) representing the string pattern image along with an indication of the class of the closed cells.

2. The method according to claim 1, wherein the classification is graphically visualized in the representation, preferably by assigning one or more of the following graphical parameters to predetermined classes of the classification: color value, tonal value, hatching.

3. The method according to claim 1, wherein the classification is based on one or more of the following size properties of the cells: area of a cell, length of one or more lateral edges of a cell, length ratio of two lateral edges of a cell.

4. The method according to claim 1, wherein step (b) comprises:
    (b1) converting the image of the string pattern into a binary pixel image, wherein the threshold value is selected such that a first value is assigned to each of the pixels of the closed cells, and preferably also to each of the pixels of the frame, and a second value is assigned to each of the pixels of the strings; and
    (b2) identifying the closed cells as those contiguous areas of the binary image which comprise pixels of the first value and are enclosed by pixels of the second value.

5. The method according to claim 4, wherein step (c) comprises:
    (c1) determining the number of pixels of each area identified as a closed cell; and
    (c2) converting each determined number of pixels to the size of the respective closed cell.

6. The method according to claim 5, wherein step (c2) is performed on the basis of a previously taken image of a scale with identical image settings.

7. The method according to claim 4, wherein step (c) comprises:
    (c1) for each area identified as a closed cell, determining a rectangle that best approximates that area; and
    (c2) determining one or more of the following size properties of the rectangle: area of the rectangle, length of one or more lateral edges of the rectangle, length ratio of two lateral edges of the rectangle.

8. The method according to claim 7, wherein step (c2) is performed on the basis of a previously taken image of a scale with identical image settings.

9. The method according to claim 1, comprising the additional step of
    (f) determining the playing properties of the ball game racket frame on the basis of the representation of the string pattern image according to steps (d) and/or (e).

10. The method according to claim 1, comprising the additional step of (g) determining at least one alternative string pattern that approximates the playing characteristics of the represented string pattern image according to steps (d) and/or (e).

11. The method according to claim 1, comprising the additional steps of
(h) repeating the method for at least one further ball game racket frame;
(i) comparing the determined string pattern images according to steps (d) and/or (e) and optionally the playing properties according to step (f).

* * * * *